United States Patent
Tsuruta

[11] 3,709,605
[45] Jan. 9, 1973

[54] HOLOGRAPHIC INTERFEROMETRY FOR ROTATING OBJECTS

[75] Inventor: Tadao Tsuruta, Tokyo, Japan
[73] Assignee: Nippon Kogaku K.K., Tokyo, Japan
[22] Filed: March 22, 1971
[21] Appl. No.: 126,613

[30] Foreign Application Priority Data

March 28, 1970 Japan..................................45/26228

[52] U.S. Cl......................................356/109, 350/3.5
[51] Int. Cl............................G01b 9/02, G02b 27/00
[58] Field of Search ...............350/3.5; 356/106, 109; 73/67.5 H, 71.3

[56] References Cited

OTHER PUBLICATIONS (S0151 0015) Tsuruta et al., Applied Physics Letters Vol. 17, No. 2, July 1970, pp. 85-7

*Primary Examiner*—David Schonberg
*Assistant Examiner*—Ronald J. Stern
*Attorney*—Harry G. Shapiro

[57] ABSTRACT

A holography device incorporating an optical system including a semireflecting mirror disposed vertically with respect to the axis of the rotary shaft of a rotating object for producing a double-exposure hologram of the rotating object at different speeds of rotation, thereby enabling the interference measurement of a variation occurring in the configuration of the rotating object with the variation in its speed of rotation.

4 Claims, 3 Drawing Figures

PATENTED JAN 9 1973 3,709,605

INTERFERENCE FRINGE

INVENTOR
TADAO TSURUTA

BY Harry I. Shapiro
ATTORNEY

HOLOGRAPHIC INTERFEROMETRY FOR ROTATING OBJECTS

BACKGROUND OF THE INVENTION

1. Field of the Invention

This invention relates to a holography device, and more particularly to a holography device for producing a double-exposure hologram of a rotating object at different speeds of rotation to thereby enable the interference measurement of a variation occurring in the configuration of the rotating object with the variation in its speed of rotation.

2. Description of the Prior Art

The recent development of holography has promoted the development of the so-called holography interference method. According to this method, any slight variation in the configuration of an object can be measured with the same accuracy as achieved by the ordinary light-wave interference method, independently of the surface finish and configuration of the object. The holography interference method, however, has heretofore been limited in use to the measurement of static variations and it has very rarely been applied for the dynamic measurement of an object rotating at high speeds. Such limitations are due to the fact that there is no synchronizing technique available for achieving perfect spatial agreement between the images reproduced from holograms recorded at two different points of time, i.e., the time when the object is stationary and the time when the object is rotating.

SUMMARY OF THE INVENTION

An object of this invention is to provide a device for achieving such synchronization by using an optical arrangement. According to the present invention, a double-exposure hologram of a rotating object is produced on a recording medium, which is rotated in synchronism and in the same direction with the rotating object, by an reference beam directed along the axis of the rotary shaft of the rotating object and an object beam from said object on which an illuminating beam directed along the axis impinges, thus enabling the interference measurement of a variation occurring in the configuration of the object between two different points of time.

BRIEF DESCRIPTION OF THE DRAWINGS

The invention will be better understood from the following detailed description of embodiments thereof taken in conjunction with the accompanying drawings, in which.

DESCRIPTION OF THE PREFERRED EMBODIMENTS

Figure 1:
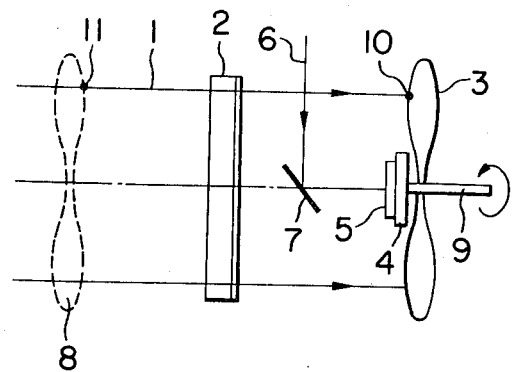
FIG. 1 is a schematic view of an arrangement for producing a hologram according to an embodiment of the present invention.

Referring to FIG. 1, designates a coherent collimated beam for illuminating a rotating object 3. A translucent or semi-reflecting mirror 2 is disposed perpendicular to normal to the coherent collimated beam 1. The rotating object 3 to be illuminated is fixed on a rotary shaft 9. A hologram supporting member 4 is fixed on one end of the rotary shaft 9. A holographic medium 5, such as a high resolution photographic medium, is supported by the hologram supporting member 4 so that it is rotated in unison with the rotating object. Numeral 6 designates a coherent reference beam. Between the semi-reflecting mirror 2 and the rotating object 3 there is disposed a plane mirror 7 in such a manner that the reference beam 6 incident thereon is directed parallel with the coherent beam 1.

Figure 2:
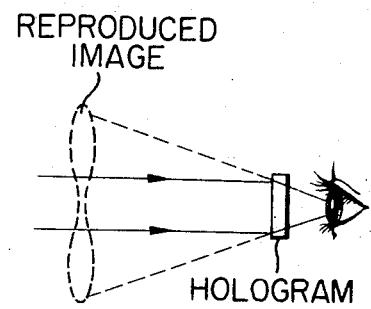
FIG. 2 is a schematic view of an arrangement for reproducing the hologram according to an embodiment of the present invention.

With this arrangement, a virtual image 8 of the object 3 is formed through the semi-reflecting mirror 2, as indicated by an imaginary outline. Part of collimated beam 1 passes through the semi-reflecting mirror 2 and illuminates the rotating object 3. An object beam reflected from the rotating object 3 impinges upon and is reflected from the semi-reflecting mirror 2 to reach the holographic medium 5 (as if the object beam were emitted from the virtual image 8). The reference beam 6 is reflected from the plane mirror 7 and is superimposed thereafter with the object beam on the holographic medium 5 to produce thereon a hologram of the rotating object 3. Since the rotary shaft 9 of the object 3 is perpendicular to the plane of the semi-reflecting mirror 2, any point indicated as at 10 on the rotating object 3 will appear as a point image 11 revolving in a plane in parallel with the reflecting surface of the semi-reflecting mirror 2. Therefore, the positional relationship among the reference beam 6 and the holographic medium 5 and the image 11 corresponding to the point 10 on the object 3 is invariable with respect to the angle of rotation of the object. Thus, when a double-exposure hologram recorded at different speeds of rotation, namely a static hologram of the object when it is stationary and dynamic hologram of the object when it is rotating, are illuminated by a collimated beam passing through a reproducing device as shown in FIG. 2, there are obtained two reproduced images which are always spatially in agreement with each other, and any variation in the configuration of the object between the time of static exposure and the time of dynamic exposure may be observed as contours represented by the interference stripes as shown in FIG. 2. The beam used for recording may be single-oscillation pulse laser such as giant pulse or ruby laser, and the beam used for reproduction may be continuous-oscillation laser such as helium neon gas laser.

In the embodiment of FIG. 1, the plane mirror 7 may be eliminated if desired. In such a case, no reference beam 6 impinges on the holographic medium 5, but part of the collimated beam 1 which is transmitted through the semi-reflecting mirror 2 and directly reaches the dry plate 5 may be utilized as the reference beam.

Figure 3:
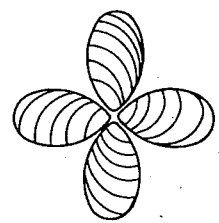
FIG. 3 schematically shows an arrangement for producing a hologram according to another embodiment of the present invention.
Figure 3:
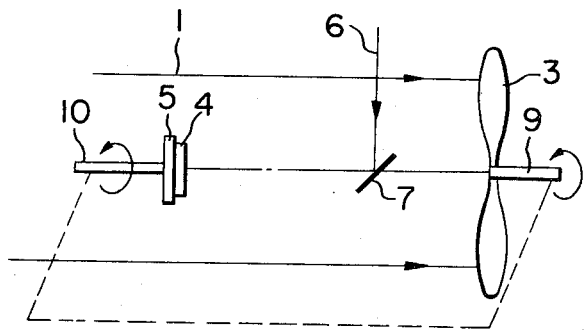

Referring now to FIG. 3, there is shown another embodiment of the present invention in which the semi-reflecting mirror is eliminated. The hologram supporting member 4 fixed on one end of a shaft 10 is disposed separately from the rotating object 3, and the plane mirror 7 is interposed between the object 3 and the supporting member 4. The shaft 10 of the hologram supporting member 4 is rotatable in the same direction and in synchronism with the rotary shaft 9 of the object 3, so that a holographic medium 5 supported by the supporting member 4 is rotatable in the same direction and in synchronism with the rotating object 3. Collimated beam 1 is reflected by the rotating object 3 and thereafter impinges on the holographic medium 5, while the reference beam 6 is reflected by the plane mirror 7 and impinges on the holographic medium 4.

Thus, according to the present invention, the dynamic interference measurement of a rotating object can be accomplished by using the holography interference method and this is useful for the measurement of the turbine blades in jet engines, automobile engines and the like.

I claim:

1. A holography device for producing a double-exposure hologram of a rotating object at different speeds of rotation to thereby enable the interference measurement of a variation occuring in the configuration of the rotating object with the variation in its speed of rotation, said device comprising:
   a rotary shaft for supporting an object for rotation therewith;
   means for producing pulsed mutually coherent object illuminating and reference beams, each of said beams being directed along the axis of said shaft so that the beams are symmetrical with respect to the axis; and
   a holographic recording medium disposed on and perpendicular to the axis of said rotary shaft for receiving both a reference beam directed along said axis and an object beam from the object on which the illuminating beam directed along said axis has impinged, the recording medium being rotatable in synchronism and in the same direction with the object to superimpose the reference beam on the object beam to thereby produce a hologram of the rotating object;
   whereby the reference beam and the object beam impinge on said recording medium at the same location thereof independently of the speed of rotation of the object, thereby producing the double-exposure hologram of said rotating object at the same location of said recording medium.

2. A holography device according to claim 1, further comprising:
   a semi-reflecting mirror disposed perpendicular to the axis of said rotary shaft and forwardly of the object in the direction of travel of said illuminating beam, said recording medium being supported at one end of said rotary shaft and located between said semi-reflecting mirror and the object with the light receiving surface thereof facing the semi-reflecting mirror.

3. A holography device according to claim 1, further comprising:
   a shaft for supporting said recording medium for rotation therewith, said shaft being disposed forwardly of the object in the direction of travel of said illuminating beam and coaxially with said rotary shaft for supporting the object, said shaft for supporting the recording medium and said rotary shaft being rotated in the same direction and in synchronism with each other, said recording medium being disposed with the light receiving surface thereof facing the object to thereby directly receive the object beam reflected by said rotating object; and
   means interposed between said rotating object and said recording medium for directing the reference beam along the axis of said rotary shaft of said rotating object to said recording medium.

4. A holography device according to claim 2, further comprising:
   reflecting means for directing the reference beam to the holographic recording medium, the reflecting means being disposed between the semi-reflecting mirror and the recording medium.

* * * * *